(12) United States Patent
Friedrich et al.

(10) Patent No.: US 11,814,019 B2
(45) Date of Patent: *Nov. 14, 2023

(54) HYDRAULIC BRAKING SYSTEM FOR A VEHICLE HAVING AT LEAST TWO AXLES

(71) Applicant: Robert Bosch GmbH, Stuttgart (DE)

(72) Inventors: Thomas Friedrich, Ingersheim (DE); Dirk Drotleff, Oberstenfeld-Gronau (DE); Ralf Kleemann, Benningen am Neckar (DE); Daniel Brenndoerfer, Ludwigsburg (DE); Bernd Hienz, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 406 days.

This patent is subject to a terminal disclaimer.

(21) Appl. No.: 17/254,666

(22) PCT Filed: May 24, 2019

(86) PCT No.: PCT/EP2019/063484
§ 371 (c)(1),
(2) Date: Dec. 21, 2020

(87) PCT Pub. No.: WO2020/001880
PCT Pub. Date: Jan. 2, 2020

(65) Prior Publication Data
US 2021/0221348 A1  Jul. 22, 2021

(30) Foreign Application Priority Data

Jun. 28, 2018 (DE) ...................... 10 2018 210 566.9

(51) Int. Cl.
*B60T 13/58* (2006.01)
*B60T 7/12* (2006.01)
(Continued)

(52) U.S. Cl.
CPC ................ *B60T 13/58* (2013.01); *B60T 7/12* (2013.01); *B60T 13/16* (2013.01); *B60T 13/686* (2013.01);
(Continued)

(58) Field of Classification Search
CPC . B60T 13/58; B60T 7/12; B60T 13/16; B60T 2270/406; B60T 17/221; B60T 2270/402; B60T 2270/413; B60T 13/686
See application file for complete search history.

(56) References Cited

U.S. PATENT DOCUMENTS 11,148,651 B2 * 10/2021 Hienz ...................... B60T 7/12
11,505,169 B2 * 11/2022 Friedrich .............. B60T 13/686
(Continued)

FOREIGN PATENT DOCUMENTS

DE  10 2011 003 346 A1  9/2011
DE  10 2013 224 783 A1  6/2015
(Continued)

OTHER PUBLICATIONS

International Search Report corresponding to PCT Application No. PCT/EP2019/063484, dated Jul. 29, 2019 (German and English Language Documents) (6 pages).

*Primary Examiner* — Pamela Rodriguez
(74) *Attorney, Agent, or Firm* — Maginot, Moore & Beck LLP

(57) ABSTRACT

A hydraulic braking system for a vehicle has two sub-braking systems hydraulically separated from one another. A first sub-braking system of a first axle has a first circuit, a main system with a first power supply and a first ECU, and a secondary system with a second power supply and a second ECU. The first circuit includes first and second pressure generators assigned, respectively, to the main system and the secondary system, in parallel between a fluid (Continued)

container and wheel brakes. A modulation unit connects the pressure generators to the wheel brakes. A second sub-braking system of a second axle includes a second circuit and an auxiliary system with a third power supply and a third ECU. The second circuit includes a pressure generator assigned to the auxiliary system arranged between a fluid container and wheel brakes, and a modulation unit connecting the pressure generators to the wheel brakes.

20 Claims, 6 Drawing Sheets

(51) Int. Cl.
    *B60T 13/16*     (2006.01)
    *B60T 13/68*     (2006.01)
    *B60T 17/22*     (2006.01)

(52) U.S. Cl.
    CPC ....... *B60T 17/221* (2013.01); *B60T 2270/402* (2013.01); *B60T 2270/406* (2013.01); *B60T 2270/413* (2013.01)

(56) References Cited

U.S. PATENT DOCUMENTS

| | | | |
|---|---|---|---|
| 2012/0299367 A1* | 11/2012 | Ross | B60T 8/4872 |
| | | | 303/3 |
| 2016/0009267 A1 | 1/2016 | Lesinski, Jr. | |
| 2017/0001612 A1* | 1/2017 | Bauer | B60T 8/4081 |

FOREIGN PATENT DOCUMENTS

| | | |
|---|---|---|
| DE | 10 2013 227 065 A1 | 6/2015 |
| EP | 2 754 592 A2 | 7/2014 |
| FR | 2 588 813 A1 | 4/1987 |

\* cited by examiner

HYDRAULIC BRAKING SYSTEM FOR A VEHICLE HAVING AT LEAST TWO AXLES

This application is a 35 U.S.C. § 371 National Stage Application of PCT/EP2019/063484, filed on May 24, 2019, which claims the benefit of priority to Serial No. DE 10 2018 210 566.9, filed on Jun. 28, 2018 in Germany, the disclosures of which are incorporated herein by reference in their entirety.

The disclosure is based on a hydraulic brake system for a vehicle having at least two axles, in particular for a highly automated or autonomous vehicle.

The prior art has disclosed vehicles having at least one highly automated or autonomous driving function, which functions can at least partially perform an actual driving task. As a result, the vehicles can drive in a highly automated or autonomous fashion by virtue of the fact that the vehicles independently detect the course of the road, other road users or obstacles, for example, and calculate the corresponding actuation commands in the vehicle and pass them on to the actuators in the vehicle, as a result of which the driving profile of the vehicle is correctly influenced. In such a highly automated or autonomous vehicle, the driver is generally not involved in the events on the road. Nevertheless, measures and means are provided which make it possible for the driver to be able to intervene himself in the events on the road at any time.

In addition, brake systems for vehicles which are configured for actuation by a vehicle driver with a hydraulic intervention are known in the prior art. As a result, when the brake system fails it is ensured that the driver can still apply sufficient braking force to the wheels of the vehicle by activating the brake pedal. This configuration decisively influences the topology of contemporary brake systems. It is therefore possible, for example, for the size of a tandem master brake cylinder to be tailored to maintaining a good performance in the fallback level. In addition, the brake systems can be embodied as what are referred to as coupled brake systems or power-assisted brake systems. However, these systems are also implemented in such a way that a hydraulic intervention by the driver is still provided as a fallback level as in the past. Power-assisted braking equipment is unsuitable for highly autonomous or autonomous vehicles since in such cases there is no longer a driver to be assisted during an autonomous driving function and the brake system has to build up the braking power completely independently.

DE 10 2013 227 065 A1 discloses a hydraulic brake system and a method for operating such a brake system. The hydraulic brake system comprises a master brake cylinder, at least one wheel brake cylinder, a first brake pressure generator and a second brake pressure generator. In this context, the master brake cylinder can be connected hydraulically to the at least one wheel brake cylinder via the second brake pressure generator. In this context, the first brake pressure generator and the second brake pressure generator can be connected hydraulically in parallel or in series between the master brake cylinder and the at least one wheel brake cylinder.

US 2016/009267 A discloses a pedal-free electronically controlled hydraulic brake system with a redundant pump. Such a brake system for an autonomous vehicle comprises a brake device which is configured to brake a vehicle wheel. A first control system comprises a first pump which is fluidically connected to the brake device via a hydraulic circuit. A second control system comprises a second pump which is fluidically connected to the brake device via the hydraulic circuit. The second pump is connected fluidically in parallel with the first pump. A control device has a communication connection to the first and second control systems. The control device is configured to sense a fault in the first control system and to activate the second pump in order to pressurize the hydraulic circuit in reaction to the fault in the first control system.

SUMMARY

The hydraulic brake system for a vehicle having at least two axles, in particular for a highly automated or autonomous vehicle, having the features described herein has the advantage that a simple, robust and cost-effective brake circuit architecture without mechanical and/or hydraulic intervention via the driver is made available, which architecture makes possible sufficient braking performance even in the case of a fault, by virtue of three pressure generators and a suitable redundancy concept.

Furthermore, embodiments of the hydraulic brake system for a vehicle make possible a facilitated mounting concept with pre-mounting of the two sub-brake systems on the corresponding vehicle axles. Of the three pressure generators, two are implemented in a redundant sub-brake system in a parallel connection on a first axle, preferably on a front axle. The third pressure generator is implemented in a further sub-brake system on a second axle, preferably on a rear axle. There is no hydraulic connection between the sub-brake systems on the various axles. For example, plunger systems, pump systems or pump systems with pressure accumulators can be used as pressure generators or volume generators. Electrohydraulic actuators, in which an electrically conductive fluid is set in motion by applying current and a magnetic field, are also conceivable. In this context, the pressure generators are each actuated by a separate control apparatus, wherein the pressure generators of the first sub-brake system are connected to different on-board power systems. The third pressure generator of the second sub-brake system is connected to a further on-board power system or to one of the on-board power systems to which one of the pressure generators of the first sub-brake system is connected. The brake system is configured as a pure brake-by-wire system, this means that a mechanical and/or hydraulic intervention by the driver is not possible, and both autonomous braking requests and requests by the driver are communicated in a purely electrical fashion to the brake system via a data bus. The dual-circuit character of the overall brake system is provided by the proposed architecture with separate sub-brake systems on different axles.

A further advantage of embodiments of the hydraulic brake system that have a parallel hydraulic connection of the pressure generators of the first sub-brake system is that the brake system is still functionally capable if there is a mechanical interruption in one of the suction paths, since each pressure generator has a separate suction path. In addition, the parallel arrangement of the pressure generators permits simpler expansion to more than two pressure generators which are connected in parallel, since in contrast to a serial arrangement of the pressure generators pressure losses can be minimized. In the case of a serial connection of the pressure generators, the pressure losses rise as a result of the series connection of the pressure generators. Furthermore, in the case of pressure generators which are arranged in parallel, the volume flows can be added so that in order to implement the full system performance as a type of hot redundancy the pressure generators can be given smaller dimensions in terms of delivery capacity, in order to be able to fulfil the request jointly.

Embodiments of the present disclosure make available a hydraulic brake system for a vehicle having at least two axles, in particular for a highly automated or autonomous vehicle, having at least two sub-brake systems which are hydraulically separate from one another. In this context, a first sub-brake system comprises a first brake circuit, a main system which has a first power supply and a first evaluation and control unit, and a secondary system which has the second power supply which is independent of the first power supply, and a second evaluation and control unit, for redundantly generating pressure in the first brake circuit. The first sub-brake system is assigned to a first axle having at least two wheel brakes. The first brake circuit comprises a first pressure generator which is assigned to the main system, a second pressure generator which is assigned to the secondary system, which pressure generators are connected hydraulically in parallel between a first fluid container and the at least two wheel brakes of the first axle, and a first modulation unit for hydraulically connecting the pressure generators to the at least two wheel brakes and for performing individual brake pressure modulation in the at least two wheel brakes. A second sub-brake system comprises a second brake circuit and a subsidiary system which has a third power supply and a third evaluation and control unit, for generating pressure in the second brake circuit. The second sub-brake system is assigned to a second axle having at least two wheel brakes. The second brake circuit comprises a third pressure generator which is assigned to the subsidiary system and is arranged between a second fluid container and the at least two wheel brakes of the second axle, and a second modulation unit for hydraulically connecting the pressure generator to the at least two wheel brakes and for performing the individual brake pressure modulation in the at least two wheel brakes.

By virtue of the individual brake pressure modulation in the individual wheel brakes, different closed-loop control functions, such as for example an anti-lock brake system ABS, a traction control system ASR, a vehicle movement dynamics control system FDR or ESP can be used for providing longitudinal and transverse stabilization of the vehicle. Since these control functions are known per se, more details are not given on them here.

Embodiments of the brake system make possible and/or support new fabrication concepts for vehicle manufacturers. Since no hydraulic lines run between the axles through the vehicle, the hydraulically separate sub-brake systems already make it possible to mount a brake system on the corresponding axle module. Therefore, the mounting of the brake system and the putting into operation of the brake system no longer take place on the particularly time-critical main line but instead can be laid on a subsidiary "subassembly" line. Alternatively, a complete axle module with a filled brake system can also be supplied to the fabrication line of the vehicle manufacturer and then only has to be integrated mechanically into the vehicle and electrically connected. In addition, installation and/or packaging advantages are obtained since the sub-brake systems are smaller and/or lighter in weight than a central brake system and can therefore be integrated more easily into the given installation space. By eliminating brake lines from the front to the rear, installation space is also freed up and in the case of electric battery vehicles with a battery pack (battery packs), the mounting of the battery pack is made easier. Furthermore, in this way in addition to the specified fabrication advantages easier changing of the battery is also possible either when servicing or as a replacement battery (exchanging the battery instead of charging). Furthermore, the time for hydraulically filling the brake system is also optimized through reduced line lengths, a smaller circuit volume per sub-brake system and separate filling of the two sub-brake systems away from the main fabrication line of the vehicle. Furthermore, the risk of damaging hydraulic lines in the underfloor or between the front axle and the rear axle during fabrication, in the driving mode or in servicing is reduced so that failure probabilities can also be slightly reduced.

As a result of the threefold pressure generator redundancy, longer autonomous continuous travel ("complete the mission") can also be made possible after an initial fault which leads to the loss of a pressure generator or of a sub-brake system, since redundancy is still present.

Embodiments of the disclosure have fewer components than known brake systems since fewer valves, shorter brake lines, no pedal travel simulator and no mechanism are necessary to generate the driver pressure or boost it and transmit it onward so that lower brake system costs are incurred. In addition, the system costs become lower since only one hydraulic connection is present at the wheel brakes and there is no need for any alternative solutions with two connections in the brake caliper which act on different pistons. Furthermore, the fluid containers have just one hydraulic connection per brake circuit, and alternative solutions with a plurality of connections are superfluous.

Furthermore, lower integration costs are incurred at the vehicle manufacturer since owing to the electrical actuation without a mechanical and/or hydraulic intervention via the driver the embodiments of the disclosure permit a simple design, in particular for righthand drive and lefthand drive vehicles and free up installation space at the bulkhead between the engine compartment and the vehicle passenger compartment. Since none of the brake system actuators has to be mounted on the bulkhead, NVH (Noise, Vibration, Harshness) advantages are also obtained. Owing to the smaller number of components the weight and the volume also become lower in comparison with known brake systems.

The evaluation and control unit can be understood here to be an electrical apparatus such as for example a control apparatus which processes or evaluates acquired sensor signals. The evaluation and control unit can have at least one interface which can be embodied by means of hardware and/or software. In the case of a hardware embodiment, the interfaces can be, for example, part of what is referred to as an ASIC system, which includes a wide variety of functions of the evaluation and control unit. However, it is also possible for the interfaces to be separate integrated circuits or to be composed at least partially of discrete components. In the case of a software embodiment, the interfaces can be software modules which are present, for example, on a microcontroller together with other software modules. A computer program product with program code which is stored in a machine-readable carrier such as a semiconductor memory, a hard disk memory or an optical memory and is used to carry out the evaluation when the program is run by the evaluation and control unit is also advantageous.

For the acquisition of the sensor signals, sensor units are provided which are understood here to be assemblies which comprise at least one sensor element which directly or indirectly senses a physical variable or a change in a physical variable and preferably converts it into an electrical sensor signal. This can take place, for example, by emitting and/or receiving soundwaves and/or electromagnetic waves and/or by means of a magnetic field or the change in a magnetic field and/or by receiving satellite signals, for example of a GPS signal. Such a sensor unit can comprise, for example, acceleration sensor elements which sense acceleration-relevant information of the vehicle, and/or sensor elements which detect objects and/or obstacles and/or other vehicle surroundings data which is relevant to a crash and make it available for evaluation. Such sensor elements can be based, for example, on video technologies and/or radar technologies and/or lidar technologies and/or PMD technologies and/or ultrasound technologies. In addition, it is also possible to evaluate signals and information on an existing ABS sensor system and the variables which are derived in the control apparatus which is provided for it. On the basis of the acceleration-relevant information and/or variables determined therefrom it is possible for example to estimate a vehicle movement and a vehicle position in three-dimensional space and evaluate them for the purpose of accident detection.

In order to determine the position of the vehicle, it is possible to use, for example, global navigation satellite systems GNSS (Global Navigation Satellite System). In this context, GNSS is used as a generic term for the use of existing and future global satellite systems such as NAVSTAR GPS (Global Positioning System) of the United States of America, GLONASS (Global Navigation Satellite System) of the Russian Federation, Galileo of the European Union and Beidou of the People's Republic of China, etc.

A highly automated or autonomous vehicle is understood to be a vehicle which has at least one highly automated or autonomous driving function which can at least partly perform an actual driving task. By means of this at least one highly automated or autonomous driving function, the vehicle detects, for example, the course of the road, other road users or obstacles automatically and calculates the corresponding actuation commands which are passed on to the actuators in the vehicle, as a result of which the driving profile of the vehicle is correctly influenced. In such a highly automated or autonomous vehicle, the driver is generally not involved in the events on the road. Nevertheless, measures and means are provided, for example in the form of electrical or electronic activation elements, which make it possible for the driver to be able to be intervene himself in the events on the road at any time. The driver's braking request which is generated by means of the activation elements is then passed on to the main system and/or the secondary system by means of electrical signals. A mechanical and/or hydraulic intervention by the driver is, however, not present.

The at least one driving function evaluates, for the purpose of trajectory planning, vehicle data acquired from internal sensor units such as ABS interventions, steering angle, position, direction, speed, acceleration etc. and/or vehicle surroundings data which are acquired, for example, by means of camera sensor units, radar sensor units, lidar sensor units and/or ultrasound sensor units, and said driving function correspondingly actuates the evaluation and control units of the main system and of the secondary system in order to generate a desired brake pressure and/or in order to implement stabilization processes in the longitudinal direction and/or transverse direction by means of individual brake pressure modulation in the wheel brakes.

Advantageous improvements of the hydraulic brake system for a vehicle having at least two axles, in particular for a highly automated or autonomous vehicle, are possible by virtue of the measures and developments disclosed below.

It is particularly advantageous that the first modulation unit and/or the second modulation unit can respectively comprise an inlet valve and respectively an outlet valve for each of the assigned wheel brakes for performing individual brake pressure modulation. The inlet valves can be embodied, for example, as adjustable solenoid valves which are open in the deenergized state. The outlet valves can be embodied, for example, as electromagnetic switching valves which are closed in the deenergized state. By means of this embodiment of the modulation unit it is advantageously possible to use components from already known ESP systems and to achieve very low overall system costs by means of already existing scale effects (millions of ESP systems are constructed).

In one advantageous refinement of the brake system, the first sub-brake system and/or the second sub-brake system can be embodied as hydraulically open systems, wherein a first pressure discharge path in the first sub-brake system can connect the outlet valves of the assigned wheel brakes of the first axle to the first fluid container. A second pressure discharge path in the second sub-brake system can connect the outlet valves of the assigned wheel brakes of the second axle to the second fluid container. A hydraulically open brake system is understood to be a brake system in which brake fluid which is discharged during an individual brake pressure modulation process can be fed back to a corresponding fluid container from the wheel brakes via a corresponding pressure discharge path. The open system is additionally defined by the fact that during wheel-specific pressure modulation or pressure reduction brake fluid volumes can be discharged from the pressure circuit via the outlet valves directly back into the corresponding fluid accumulator at atmospheric pressure. This has the advantage in a system which is decoupled from the driver that the low pressure accumulator and switching valve components for the pump intake path are not required and furthermore also a pressure reduction of any desired magnitude can be brought about since a storage chamber can never become full.

In a further advantageous refinement of the brake system, the pressure generators can each be embodied as a plunger system or as a pump system or as a pump system with a pressure accumulator or as electrohydraulic actuators. It is therefore possible, for example in a particularly advantageous embodiment of the brake system, for the first pressure generator of the main system to be embodied as a first plunger system, and the second pressure generator as a second plunger system or as a pump system, and the third pressure generator of the subsidiary system as a third plunger system. The embodiment of the first pressure generator and of the third pressure generator as plunger systems gives rise to a good NVH performance in the overall system and easier and/or more accurate monitoring and improved control. This permits both the position and the volume information and pressure increase information in the main system and in the subsidiary system to be acquired more easily and, in particular, more accurately in comparison with other concepts (pump system). By virtue of the embodiment of the second pressure generator as a plunger system, a very good NVH performance is obtained both in the normal operating mode and in the event of the failure of the main system. By virtue of the embodiment of the second pressure generator as a pump system, even lower costs, installation space and weight are obtained in comparison with other concepts (plunger system). As an alternative in the first sub-brake system a pump system be used as a first pressure generator. As a further alternative, the first sub-brake system can be embodied as a closed system which uses a pump system as a second pressure generator.

In a further advantageous refinement of the brake system, the first brake circuit can have, for the second pressure generator embodied as a pump system, a pressure maintenance and control valve which is assigned to the secondary system and is actuated by the second evaluation and control unit and supplied with power by the second power supply.

In a further advantageous refinement of the brake system, the first pressure generator which is embodied as a first plunger system can be connected hydraulically to the first and second wheel brakes via a first solenoid valve which permits recharging of brake fluid from the first fluid container, and the second pressure generator which is embodied as a pump system can be connected directly to the first and second wheel brakes. Owing to the open architecture, the first plunger system is able to recharge or sniff fluid. The first solenoid valve can be, for example, a first shutoff valve which is assigned to the secondary system, and is actuated by the second evaluation and control unit and can be supplied with power by the second power supply. Alternatively, the first solenoid valve can be the pressure maintenance and control valve of the second pressure generator which is embodied as a pump system. In this context, the solenoid valve which is used separates the plunger system from the wheel brakes, so that the plunger system cannot suck brake fluid from the wheel brakes during the recharging process.

In a further advantageous refinement of the brake system, the first pressure generator can be connected to the first and second wheel brakes via a first shutoff valve. The second pressure generator can be connected to the first and second wheel brakes via a second shutoff valve. In this context, the shutoff valves can be assigned to the main system and supplied with power by the first power supply, and can be actuated by the first evaluation and control unit in such a way that when one of the two pressure generators is activated, a hydraulic fluid cannot be fed through the other of the two pressure generators. This means that one of the two shutoff valves is opened and disconnects the corresponding pressure generator from the wheel brakes. At the same time, the other of the two shutoff valves is closed and connects the corresponding pressure generator to the wheel brakes. Alternatively, the shutoff valves can be assigned to the secondary system and supplied with power by the second power supply and activated by the second evaluation and control unit in such a way that when of the two pressure generators is activated a hydraulic fluid is not fed through the other of the two pressure generators. In this context, the first shutoff valve can be embodied, for example, as a solenoid valve which is closed in the deenergized state, and the second shutoff valve can be embodied, for example, as a shutoff valve which is open in the deenergized state. As a result of the embodiment of the first shutoff valve such that it is closed in the deenergized state the first pressure generator is hydraulically connected to the wheel brakes. As a result of the embodiment of the second shutoff valve such that it is open in the deenergized state the second pressure generator is hydraulically disconnected from the wheel brakes. Therefore, during normal operation in which the first pressure generator generates the pressure for the wheel brakes, there is no need for actuation of the shutoff valves in order to connect the first pressure generator hydraulically to the wheel brakes and to disconnect the second pressure generator hydraulically from the wheel brakes. In addition, the wheel brakes are connected to the first fluid container via the first pressure generator in order to be able to compensate temperature-induced expansion of the brake fluid in the deenergized or passive state through so-called "breathing".

Therefore in this context the term "breathing" by the main system is used. Alternatively, the first shutoff valve can be embodied, for example, as a solenoid valve which is open in the deenergized state, and the second shutoff valve can be embodied as a solenoid valve which is closed in the deenergized state. As a result of the embodiment of the first shutoff valve such that it is open in the deenergized state, the first pressure generator is hydraulically disconnected from the wheel brakes. As a result of the embodiment of the second shutoff valves such that it is closed in the deenergized state the second pressure generator is hydraulically connected to the wheel brakes. Therefore, in the normal operating mode in which the first pressure generator generates the pressure for the wheel brakes, it is necessary to actuate the shutoff valves in order to connect the first pressure generator hydraulically to the wheel brakes and to disconnect the second pressure generator hydraulically from the wheel brakes. In addition, the wheel brakes are connected to the first fluid container via the second pressure generator in order to be able to compensate temperature-induced expansion of the brake fluid in the deenergized or passive state through what is referred to as "breathing". Therefore, in this context the term "breathing" by the secondary system is used.

In a further advantageous refinement of the brake system, the second brake circuit can have, for the pressure generator which is embodied as a third plunger system, a shutoff valve which permits the charging of brake fluid from the second fluid container.

In a further advantageous refinement of the brake system, the first brake circuit can have, for the first plunger system, a suction line with a nonreturn valve, which line can additionally connect the first plunger system hydraulically to the first fluid container. In addition, the second brake circuit can have, for the third plunger system, a suction line with a nonreturn valve, which line can additionally connect the third plunger system hydraulically to the second fluid container. As a result, the recharging process of the plunger systems can be carried out more quickly, in particular at low temperatures.

In a further advantageous refinement of the brake system, the evaluation and control units of the sub-brake systems can communicate with one another via a bus system. In this context, the first and second evaluation and control unit of the first sub-brake system can be implemented as a master, and the third evaluation and control unit of the second sub-brake system can be implemented as a slave. This means that vehicle functions, such as for example a vehicle controller are calculated and adjusted to the first and second evaluation control unit of the first sub-brake system, and actuation requests are transmitted from the first sub-brake system to the third evaluation and control unit of the second sub-brake system.

In a further advantageous refinement of the brake system, components of the first modulation unit for performing individual brake pressure modulation can be assigned to the main system so that these components of the first modulation unit and the first pressure generator are actuated by the first evaluation and control unit and supplied with power by the first power supply. Analogously, components of the second modulation unit for performing individual brake pressure modulation can be assigned to the subsidiary system so that these components of the second modulation unit and the third pressure generator can be actuated by the third evaluation and control unit and supplied with power by the third power supply. In this context, the first power supply of the main system or the second power supply of the secondary system can be used as a third power supply of the subsidiary system. Alternatively, the third power supply can be embodied as a separate power supply which is independent of the first and second power supplies.

Exemplary embodiments of the disclosure are illustrated in the drawing and explained in more detail in the following description. In the drawing, identical reference symbols denote components or elements which carry out the same or analogous functions.

DETAILED DESCRIPTION

Figure 1:
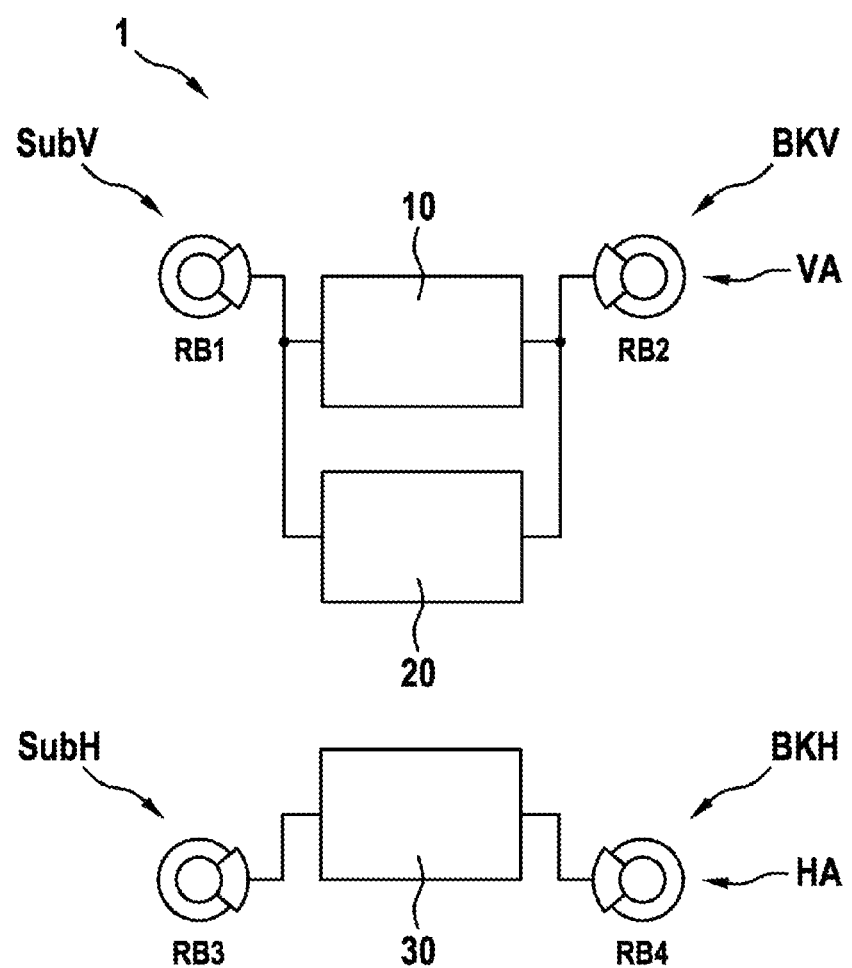
FIG. 1 shows a schematic block diagram of an exemplary embodiment of a hydraulic brake system according to the disclosure for a vehicle having at least two axles, in particular for a highly automated or autonomous vehicle.
Figure 2:
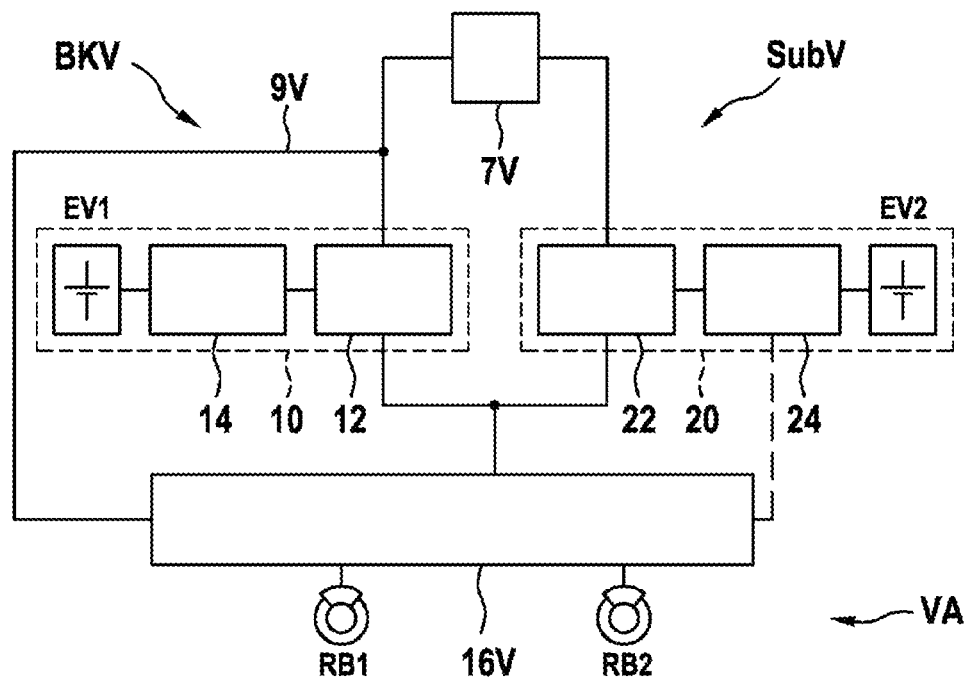
FIG. 2 shows a schematic block diagram of an exemplary embodiment of a first sub-brake system of the brake system according to the disclosure from FIG. 1.
Figure 3:
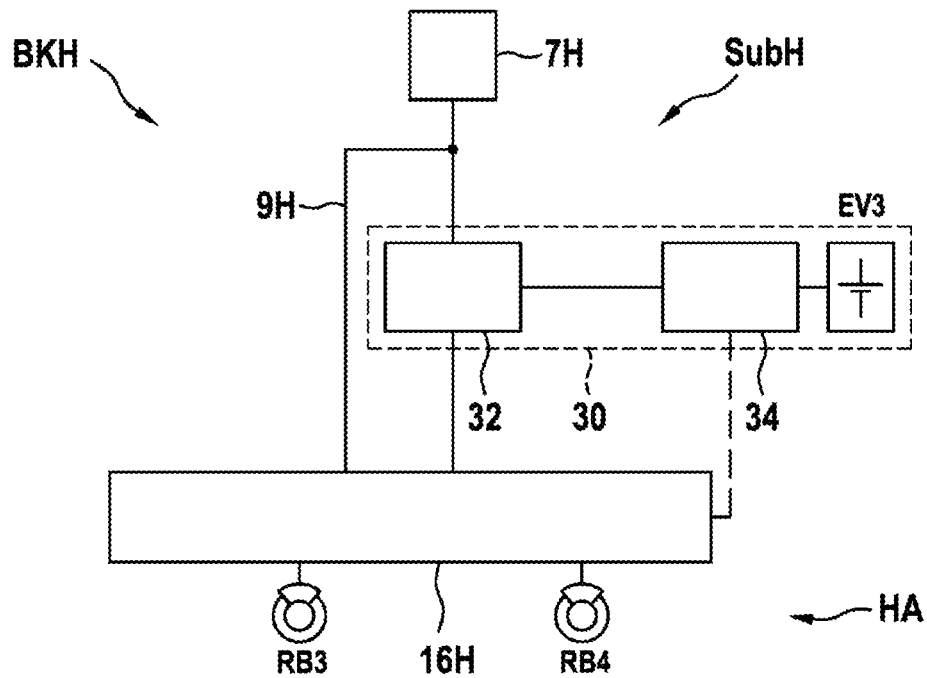
FIG. 3 shows a schematic block diagram of an exemplary embodiment of a second sub-brake system of the brake system according to the disclosure from FIG. 1.

As is apparent from FIGS. 1 to 3, the illustrated exemplary embodiment of a hydraulic brake system 1 according to the disclosure for a vehicle having at least two axles VA, HA, in particular for a highly automated or autonomous vehicle, comprises at least two sub-brake systems SubV, SubH which are hydraulically separate from one another. In this context, a first sub-brake system SubV comprises a first brake circuit BKV, a main system 10 which has a first power supply EV1 and a first evaluation and control unit 14, and a secondary system 20 which has a second power supply EV2 which is independent of the first power supply EV1, and a second evaluation and control unit 24, for redundantly generating pressure in the first brake circuit BKV. The first sub-brake system SubV is assigned to a first axle VA, here a front axle of the vehicle, having at least two wheel brakes RB1, RB2. The first brake circuit BVK comprises a first pressure generator 12 which is assigned to the main system 10, a second pressure generator 22 which is assigned to the secondary system 20 and is connected hydraulically in parallel between a first fluid container 7V and the at least two wheel brakes RB1, RB2 of the first axle VA, and a first modulation unit 16V for hydraulically connecting the pressure generators 12, 22 to the at least two wheel brakes RB1, RB2 and for performing individual brake pressure modulation in the at least two wheel brakes RB1, RB2. A second sub-brake system SubH comprises a second brake circuit BKH and a subsidiary system 30 which has a third power supply EV3 and a third evaluation and control unit 34, for generating pressure in the second brake circuit BKH. The second sub-brake system SubH is assigned to a second axle HA, here the rear axle of the vehicle, having at least two wheel brakes RB3, RB4. The second brake circuit BKH comprises a third pressure generator 32 which is assigned to the subsidiary system 30 and is arranged between a second fluid container 7H and the at least two wheel brakes RB3, RB4 of the second axle HA, and a second modulation unit 16H for hydraulically connecting the pressure generator 32 to the at least two wheel brakes RB3, RB4 and for performing individual brake pressure modulation in the at least two wheel brakes RB3, RB4.

The evaluation and control units 14, 24, 34 of the two sub-brake systems SubV, SubH communicate with one another via a bus system (not illustrated), wherein the first and second evaluation and control units 14, 24 of the first sub-brake system SubV are implemented as a master, and the third evaluation and control unit 34 of the second sub-brake system SubH is implemented as a slave. In the illustrated exemplary embodiment, the third power supply EV3 is embodied as a separate unit which is independent of the first and second power supplies EV1, EV2. In alternative exemplary embodiments (not illustrated), the first power supply EV1 of the main system 10 or the second power supply EV2 of the secondary system 20 can be used as a third power supply E3 of the subsidiary system 30.

Figure 4:
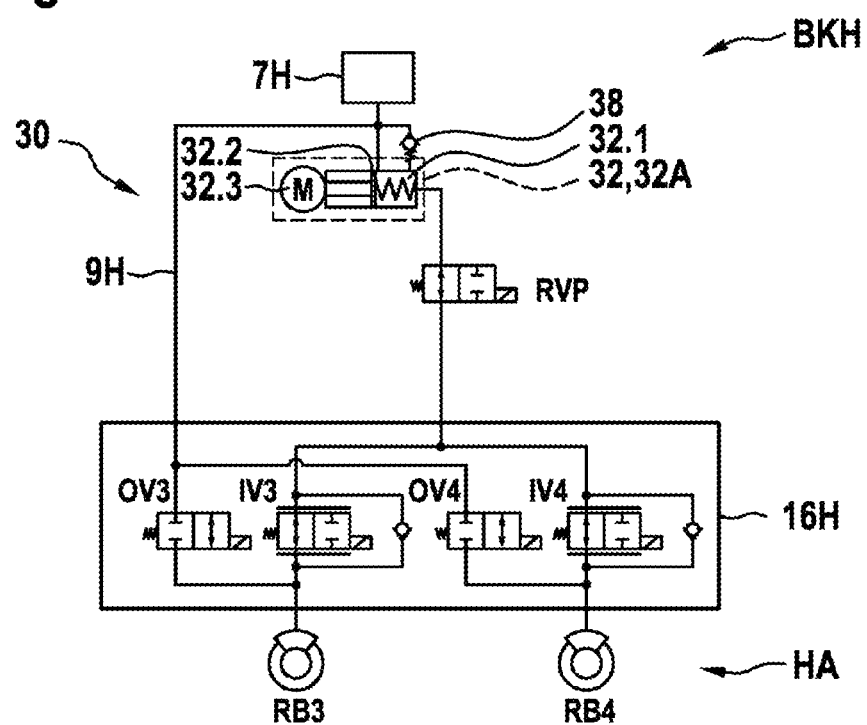
FIG. 4 shows a schematic hydraulic circuit diagram of a second brake circuit of the second sub-brake system from FIG. 3.

As is also apparent from FIG. 4, the third pressure generator 32 of the subsidiary system 30 is embodied as a plunger system 32A in the illustrated exemplary embodiment of the second brake circuit BKH. The plunger system 32A comprises a cylinder-piston unit which comprises a fluid chamber 32.1 and a piston 32.2. In this context, the piston 32.2 is moved by a drive 32.3, embodied here as an electric motor, counter to the force of a restoring spring (not denoted in more detail), in order to set a desired pressure in the second brake circuit BKH. In the illustrated exemplary embodiment, the fluid chamber 32.1 of the plunger system 32A is open in the deenergized state.

As is also apparent from FIG. 4, the second modulation unit 16H in the illustrated exemplary embodiment of the second brake circuit BKH comprises respectively an inlet valve IV3, IV4 and respectively an outlet valve OV3, OV4 for each of the assigned wheel brakes RB3, RB4 for performing individual brake pressure modulation. As is also apparent from FIGS. 3 and 4, the second sub-brake system SubH is embodied as a hydraulically open system, and a second pressure discharge path 9H in the second sub-brake system SubH connects the outlet valves OV3, OV4 of the assigned wheel brakes RB3, RB4 of the second axle HA to the second fluid container 7H.

As is also apparent from FIG. 4, the second brake circuit BKH for the second plunger system 32A has a shutoff valve RVP which makes it possible to recharge brake fluid from the second fluid container 7H. In order to recharge the fluid chamber 32.1 of the third plunger system 32A, the shutoff valve RVP is opened, so that the plunger system 32A cannot suck any fluid out of the wheel brakes RB3, RB4. In addition, the second brake circuit BKH has, for the third plunger system 32A, in addition to the direct connection to the second fluid container 7H a suction line with a nonreturn valve 38, which line additionally connects the third plunger system 32A hydraulically to the second fluid container 7H. Components of the second modulation unit 16H are assigned, for performing individual brake pressure modulation, to the subsidiary system 30 so that these components of the second modulation unit 16H, the shutoff valve RVP and the third pressure generator 32 are actuated by the third evaluation and control unit 34 and supplied with power by the third power supply EV3.

As is also apparent from FIGS. 2 and 5 to 9, the first pressure generator 12 of the main system 10 is embodied as a first plunger system 12A, and the second pressure generator 22 as a second plunger system 22A or as a pump system 22B. The plunger systems 12A, 22A each comprise a cylinder-piston unit which comprises a fluid chamber 12.1, 22.1 and a piston 12.2, 22.2. In this context, the pistons 12.2, 22.2 are each moved by a drive 12.3, 22.3, embodied here as electric motors, counter to the force of restoring springs (not denoted in more detail here) in order to set a desired pressure in the first brake circuit BKV, BKVA, BKVB, BKVC, BKVD, BKVE. In the illustrated exemplary embodiment, the fluid chambers 12.2, 22.2 of the plunger systems 12A, 22A are open in the deenergized state. The pump system 22B comprises a pump 22.1 which is driven by a drive 22.3, here an electric motor, in order to set a desired pressure in the first brake circuit BKV, BKVA, BKVB.

As is also apparent from FIGS. 2 and 5 to 9, the first modulation unit 16V in the illustrated exemplary embodiments of the first brake circuit BKV, BKVA, BKVB, BKVC, BKVD, BKVE comprises respectively an inlet valve IV1, IV2 and respectively an outlet valve OV1, OV3 for each of the assigned wheel brakes RB1, RB2 for performing individual brake pressure modulation. Components of the first modulation unit 16V are assigned, for performing individual brake pressure modulation, to the main system 10, 10A, 10B, 10C, 10D, 10E, so that these components of the first modulation unit 16V, and the first pressure generator 12, are actuated by the first evaluation and control unit 14 and supplied with power by the first power supply EV1. In addition, the first sub-brake system SubV in the illustrated exemplary embodiments is embodied as a hydraulically open system, and a first pressure discharge path 9V in the first sub-brake system SubV connects the outlet valves OV1, OV2 of the assigned wheels brakes RB1, RB2 of the first axle VA to the first fluid container 7V.

Figure 5:
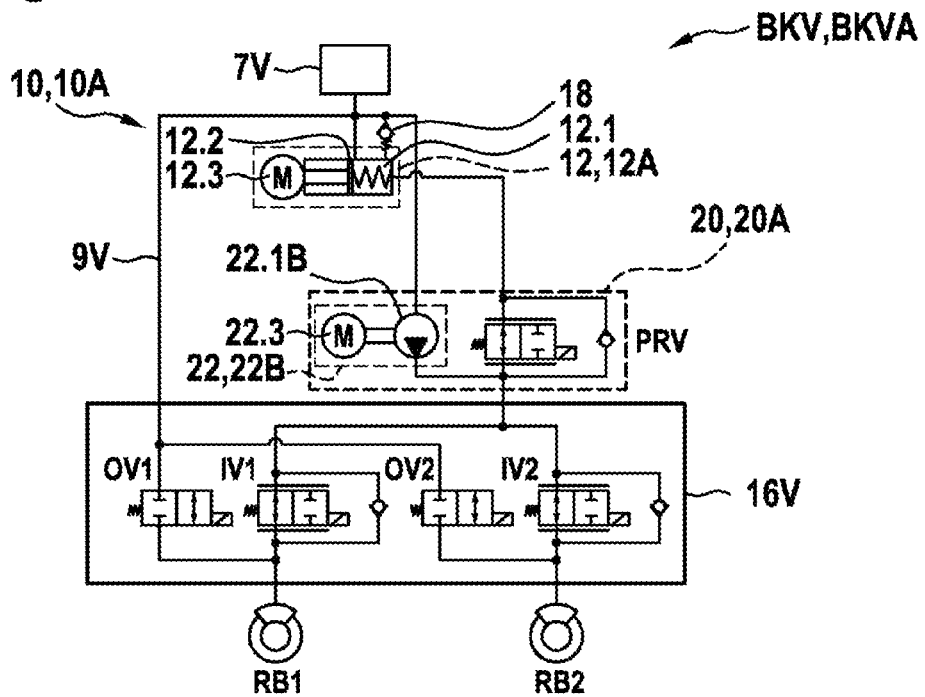
FIG. 5 shows a schematic hydraulic circuit diagram of a first exemplary embodiment of a first brake circuit of the first sub-brake system from FIG. 2.

As is also apparent from FIG. 5, in the illustrated first exemplary embodiment of the first brake circuit BKVA the first pressure generator 12 is embodied as a plunger system 12A, and the second pressure generator 22 is embodied as a pump system 22B. The first brake circuit BKVA comprises, for the second pressure generator 22 which is embodied as a pump system 22B, a pressure maintenance and control valve PRV which is assigned to the secondary system 20A and is actuated by the second evaluation and control unit 24 and supplied with power by the second power supply EV2. The first pressure generator 12 which is embodied as a plunger system 12A is connected to the wheel brakes RB1, RB2 via the pressure maintenance and control valve PRV which is embodied as a solenoid valve which is closed in the deenergized state. The pressure maintenance and control valve PRV makes it possible to recharge brake fluid from the first fluid container 7V. In order to recharge the fluid chamber 12.1 of the first plunger system 12A, the pressure maintenance and control valve PRV is opened by the second evaluation and control unit 24, so that the plunger system 12A cannot suck any fluid out of the wheel brakes RB1, RB2. In addition, the first brake circuit BKVA for the first plunger system 12A has, in addition to the direct connection to the first fluid container 7V, a suction line with a nonreturn valve 18, which line additionally connects the first plunger system 12A hydraulically to the first fluid container 7V. The pump 22.1B of the pump system 22B is connected directly to the first fluid container 7V via a suction line. As is also apparent from FIG. 5, the wheel brakes RB1, RB2 in the illustrated deenergized state are connected to the first fluid container 7V via the pressure maintenance and control valve PRV and the first pressure generator 12, in order to be able to compensate, in the deenergized or passive state, temperature-induced expansion of the brake fluid through what is referred to as "breathing". Therefore, in this context the term "breathing" by the main system 10A is used. By virtue of the arrangement of the two pressure generators 12, 22 as described in conjunction with FIG. 5, there is no need for any further shutoff valve for the operation of the first sub-brake system SubV.

Figure 6:
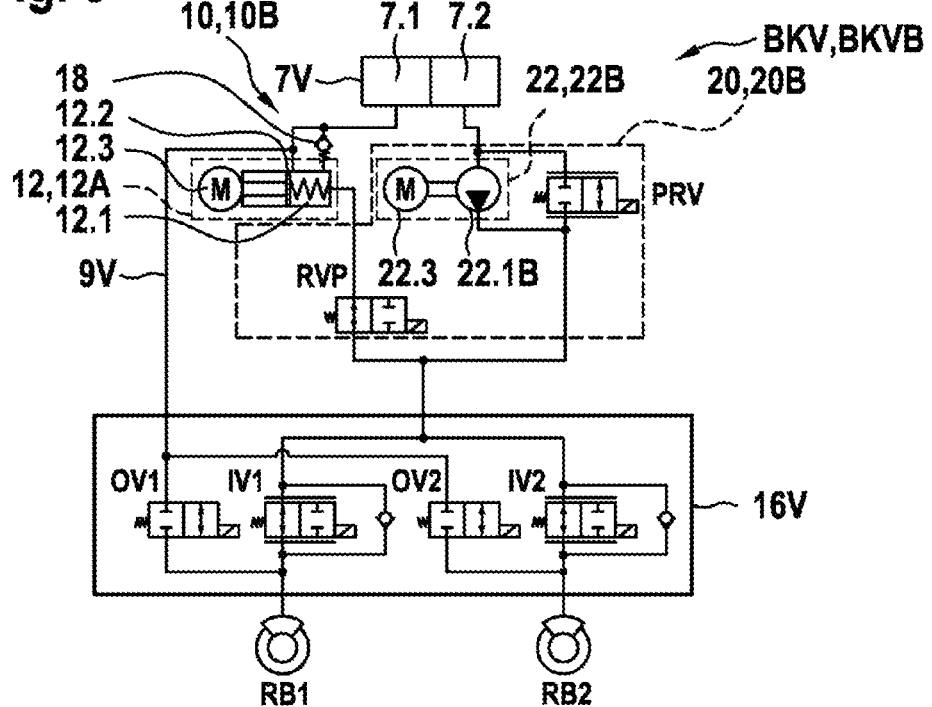
FIG. 6 shows a schematic hydraulic circuit diagram of a second exemplary embodiment of the first brake circuit of the first sub-brake system from FIG. 2.

As is also clear from FIG. 6, in the illustrated second exemplary embodiment of the first brake circuit BKVB the first pressure generator 12 is embodied as a plunger system 12A and the second pressure generator 22 is embodied as a pump system 22B. In addition, the first fluid container 7V in the illustrated exemplary embodiment comprises two separate chambers 7.1, 7.2. Analogously to the first exemplary embodiment of the first brake circuit BKVA according to FIG. 5, the first brake circuit BKVB comprises, for the second pressure generator 22 embodied as a pump system 22B, a pressure maintenance and control valve PRV which is assigned to the secondary system 20B, is actuated by the second evaluation and control unit 24 and is supplied with power by the second power supply EV2. In contrast to the first exemplary embodiment of the first brake circuit BKVA, the pressure maintenance and control valve PRV in the illustrated second exemplary embodiment of the first brake circuit BKVB is embodied as a solenoid valve which is open in the deenergized state. The first pressure generator 12 which is embodied as a plunger system 12A is connected to the wheel brakes RB1, RB2 via a shutoff valve RVP which is embodied as a solenoid valve which is closed in the deenergized state. The shutoff valve RVP makes it possible to recharge brake fluid from a first chamber 7.1 of the first fluid container 7V, is assigned to the secondary system 20B, is actuated by the second evaluation and control unit 24 and is supplied with power by the second power supply EV2. In order to recharge the fluid chamber 12.1 of the first plunger system 12A, the shutoff valve RVP is opened by the second evaluation and control unit 24 so that the plunger system 12A cannot suck fluid out of the wheel brakes RB1, RB2. In addition, the first brake circuit BKVB for the first plunger system 12A has, in addition to the direct connection to the first chamber 7.1 of the first fluid container 7V, a suction line with a nonreturn valve 18, which line additionally connects the first plunger system 12A hydraulically to the first chamber 7.1 of the first fluid container 7V. The pump 22.1B of the pump system 22B and the pressure maintenance and pressure control valve PRV are directly connected to a second chamber 7.2 of the first fluid container 7V. As is also apparent from FIG. 6, the wheel brakes RB1, RB2 are connected in the illustrated deenergized state to the first fluid container 7V via the shutoff valve RVP and the first pressure generator 12, in order to be able to compensate temperature-induced expansion of the brake fluid in the deenergized or passive state through what is referred to as "breathing". Therefore, in this context the term "breathing" by the main system 10B is used.

Figure 7:
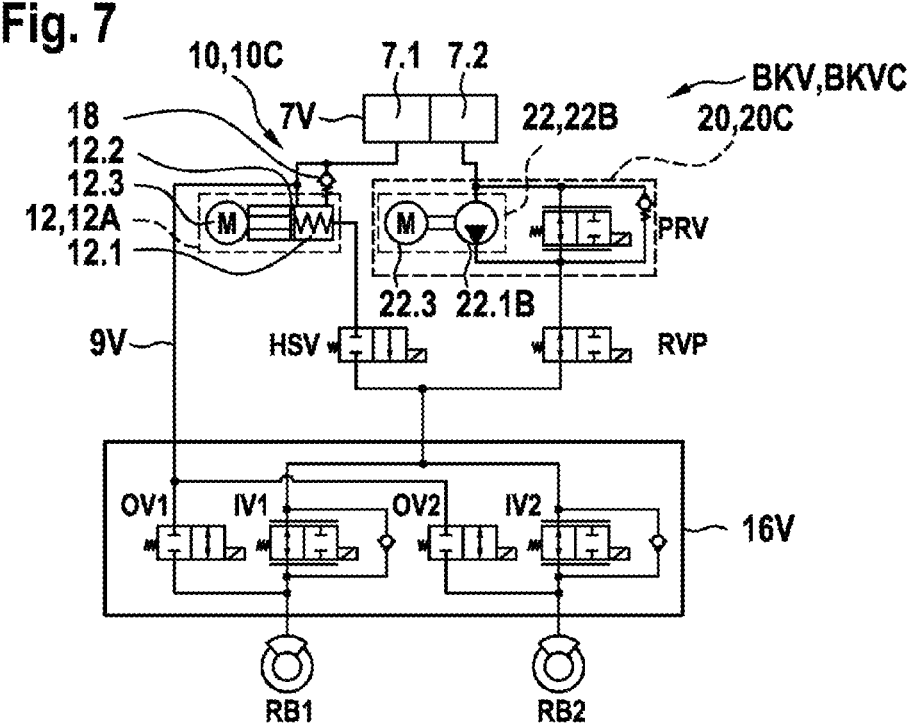
FIG. 7 shows a schematic hydraulic circuit diagram of a third exemplary embodiment of the first brake circuit of the first sub-brake system from FIG. 2.

As is also apparent from FIG. 7, in the illustrated third exemplary embodiment of the first brake circuit BKVC the first pressure generator 12 is embodied as a plunger system 12A and the second pressure generator 22 is embodied as a pump system 22B. In addition, the first fluid container 7V in the illustrated exemplary embodiment comprises two separate chambers 7.1, 7.2. Analogously to the first and second exemplary embodiments of the first brake circuit BKVA, BKVB according to FIGS. 5 and 6, the first brake circuit BKVC comprises, for the second pressure generator 22 embodied as a pump system 22B, a pressure maintenance and control valve PRV which is assigned to the secondary system 20C, is actuated by the second evaluation and control unit 24 and is supplied with power by the second power supply EV2. Analogously to the first exemplary embodiment of the first brake circuit BKVA, the pressure maintenance and control valve PRV in the illustrated third exemplary embodiment of the first brake circuit BKVC is embodied as a solenoid valve which is closed in the deenergized state. The first pressure generator 12 which is embodied as a plunger system 12A is connected to the wheel brakes RB1, RB2 via a first shutoff valve HSV which is embodied as a solenoid valve which is open in the deenergized state. The second pressure generator 22 which is embodied as a pump system 22B is connected to the wheel brakes RB1, RB2 via a second shutoff valve RVP which is embodied as a solenoid valve which is closed in the deenergized state. The shutoff valves RVP, HSV are assigned in the illustrated third exemplary embodiment of the first brake circuit BKVC to the main system 10C and are supplied with power by the first power supply EV1 and actuated by the first evaluation and control unit 14 in such a way that when one of the two pressure generators 12, 22 is actuated a hydraulic fluid is not fed through the other of the two pressure generators 12, 22. In the illustrated third exemplary embodiment, the first pressure generator 12 of the main system 10C is disconnected in the deenergized state from the wheel brakes RB1, RB2 by the opened first shutoff valve HSV, and the second pressure generator 22 is connected to the wheel brakes RB1, RB2 via the closed second shutoff valve RVP. The first shutoff valve HSV makes it possible to recharge brake fluid from a first chamber 7.1 of the first fluid container 7V. In order to recharge the fluid chamber 12.1 of the first plunger system 12A, the first shutoff valve HSV is opened by the first evaluation and control unit 14 so that the plunger system 12A cannot suck fluid from the wheel brakes RB1, RB2. In addition, the first brake circuit BKVC for the first plunger system 12A has, in addition to the direct connection to the first chamber 7.1 of the first fluid container 7V, a suction line with a nonreturn valve 18, which line additionally connects the first plunger system 12A hydraulically to the first chamber 7.1 of the first fluid container 7V. The pump 22.1B of the pump system 22B and the pressure maintenance and control valve PRV are directly connected to a second chamber 7.2 of the first fluid container 7V. As is also apparent from FIG. 7, the wheel brakes RB1, RB2 in the illustrated deenergized state are connected to the first fluid container 7V via the second shutoff valve RVP and the pressure maintenance and control valve PRV of the second pressure generator 22, in order to be able to compensate temperature-induced expansion of the brake fluid in the deenergized or passive state through what is referred to as "breathing". Therefore, in this context the term "breathing" by the secondary system 20C is used.

Figure 8:
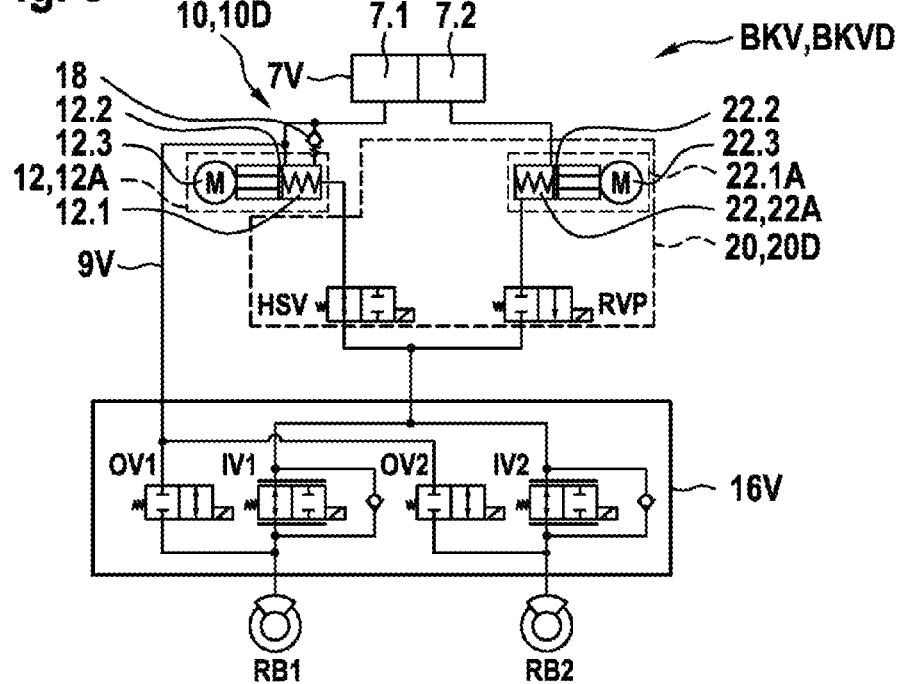
FIG. 8 shows a schematic hydraulic circuit diagram of a fourth exemplary embodiment of the first brake circuit of the first sub-brake system from FIG. 2.

As is also apparent from FIG. 8, in the illustrated fourth exemplary embodiment of the first brake circuit BKVD the first pressure generator 12 and the second pressure generator 22 are each embodied as a plunger system 12A, 22A. Analogously to the second and third exemplary embodiments, the first fluid container 7V in the illustrated exemplary embodiment comprises two separate chambers 7.1, 7.2. As is also apparent from FIG. 8, the first pressure generator 12 which is embodied as a first plunger system 12A is connected to the wheel brakes RB1, RB2 via a first shutoff valve HSV which is embodied as a solenoid valve which is closed in the deenergized state. The second pressure generator 22 which is embodied as a second plunger system 22A is connected to the wheel brakes RB1, RB2 via a second shutoff valve RVP which is embodied as a solenoid valve which is open in the deenergized state. The shutoff valves RVP, HSV are assigned in the illustrated fourth exemplary embodiment of the first brake circuit BKVD to the secondary system 20D and are supplied with power from the second power supply EV2 and are actuated by the second evaluation and control unit 24 in such a way that when one of the two pressure generators 12, 22 is activated a hydraulic fluid is not fed through the other of the two pressure generators 12, 22. In the illustrated fourth exemplary embodiment, the first pressure generator 12 of the main system 10D is connected in the deenergized state to the wheel brakes RB1, RB2 via the closed first shutoff valve HSV, and the second pressure generator 22 is disconnected from the wheel brakes RB1, RB2 by the open second shutoff valve RVP. The shutoff valves HSV, RVP permit brake fluid to be recharged from the first fluid container 7V. In order to recharge the fluid container 12.1 of the first plunger system 12A, the first shutoff valve HSV is opened by the second evaluation and control unit 24 so that the plunger system 12A cannot suck fluid from the wheel brakes RB1, RB2. In order to recharge the fluid chamber 22.1 of the second plunger system 22A, the second shutoff valve RVP is opened by the second evaluation and control unit 24 so that the plunger system 22A cannot suck fluid out of the wheel brakes RB1, RB2. In addition, the first brake circuit BKVD for the first plunger system 12A has, in addition to the direct connection to the first chamber 7.1 of the first fluid container 7V, a suction line with a nonreturn valve 18, which line additionally connects the first plunger system 12A hydraulically to the first chamber 7.1 of the first fluid container 7V. The second plunger system 22A is directly connected to the second chamber 7.2 of the first fluid container 7V. As is also apparent from FIG. 8, the wheel brakes RB1, RB2 are connected in the illustrated deenergized state to the first fluid container 7V via the first shutoff valve HSV and the first pressure generator 12, in order to be able to compensate temperature-induced expansion of the brake fluid in the deenergized or passive state through what is referred to as "breathing". Therefore, in this context the term "breathing" by the main system 10D is used.

Figure 9:
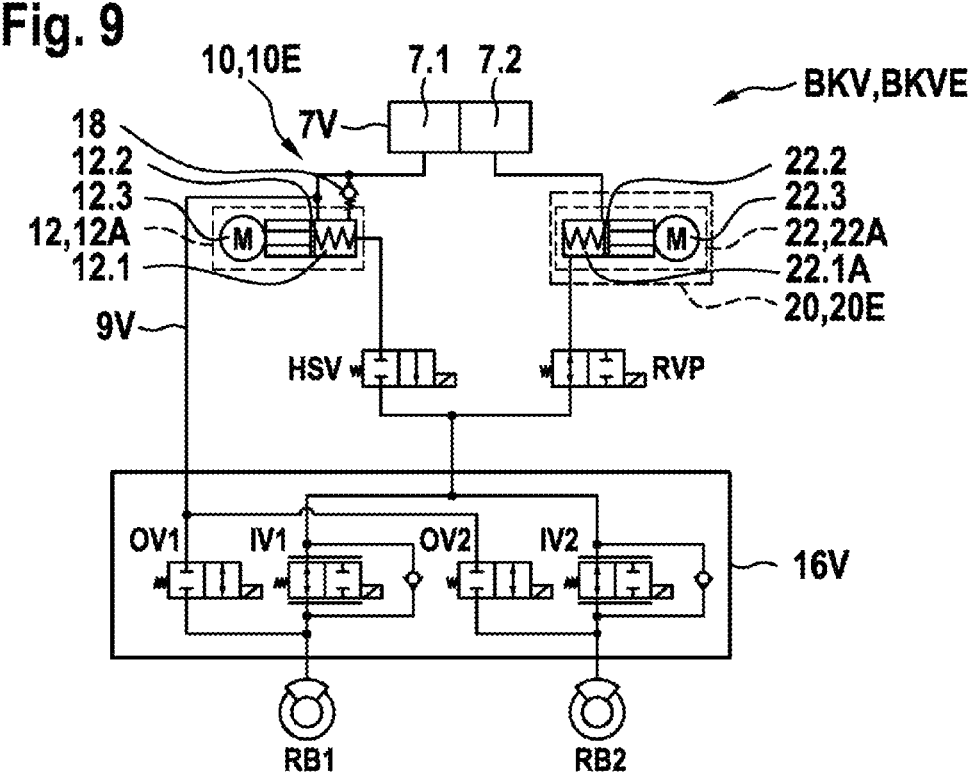
FIG. 9 shows a schematic hydraulic circuit diagram of a fifth exemplary embodiment of the first brake circuit of the first sub-brake system from FIG. 2.

As is also apparent from FIG. 9, in the illustrated fifth exemplary embodiment of the first brake circuit BKVE, the first pressure generator 12 and the second pressure generator 22 are each embodied, in a way analogous to the fourth exemplary embodiment, as a plunger system 12A, 22A, and the first fluid container 7V comprises two separate chambers 7.1, 7.2 in the illustrated exemplary embodiment. As is also apparent from FIG. 9, the first pressure generator 12 which is embodied as a first plunger system 12A is connected to the wheel brakes RB1, RB2 via a first shutoff valve HSV which is embodied as a solenoid valve which is open in the deenergized state. The second pressure generator 22 which is embodied as a second plunger system 22A is connected to the wheel brakes RB1, RB2 via a second shutoff valve RVP which is embodied as a solenoid valve which is closed in the deenergized state. The shutoff valves RVP, HSV are assigned in the illustrated fifth exemplary embodiment of the first brake circuit BKVE to the main system 10E, are supplied with power by the first power supply EV1 and are actuated by the first evaluation and control unit 14 in such a way that when one of the two pressure generators 12, 22 is activated a hydraulic fluid is not fed through the other of the two pressure generators 12, 22. In the illustrated fifth exemplary embodiment, the first pressure generator 12 of the main system 10E is disconnected in the deenergized state from the wheel brakes RB1, RB2 by the open first shutoff valve HSV, and the second pressure generator 22 is connected to the wheel brakes RB1, RB2 via the closed second shutoff valve RVP. The shutoff valves HSV, RVP permit brake fluid to be recharged from the first fluid container 7V. In order to recharge the fluid chamber 12.1 of the first plunger system 12A, the first shutoff valve HSV is opened by the first evaluation and control unit 24 so that the plunger system 12A cannot suck fluid out of the wheel brakes RB1, RB2. In order to recharge the fluid chamber 22.1 of the second plunger system 22A, the second shutoff valve RVP is opened by the first evaluation and control unit 24, so that the plunger system 22 cannot suck fluid out of the wheel brakes RB1, RB2. In addition, the first brake circuit BKVE for the first plunger system 12A has, in addition to the direct connection to the first chamber 7.1 of the first fluid container 7V, a suction line with a nonreturn valve 18, which line additionally connects the first plunger system 12A hydraulically to the first chamber 7.1 of the first fluid container 7V. The second plunger system 22A is connected directly to the second chamber 7.2 of the first fluid container 7V. As is also apparent from FIG. 9, the wheel brakes RB1, RB2 in the illustrated deenergized state are connected to the first fluid container 7V via the second shutoff valve RVP and the second pressure generator 22, in order to be able to compensate temperature-induced expansion of the brake fluid in the deenergized or passive state through what is referred to as "breathing". Therefore, in this context the term "breathing" by the secondary system 20E is used.

In alternative exemplary embodiments (not illustrated), the pressure generators 12, 22, 32 can each be embodied as a pump system with a pressure accumulator or as electrohydraulic actuators.

Embodiments of the present disclosure make available a hydraulic brake system for a vehicle having at least two axles, in particular for a highly automated or autonomous vehicle, without mechanical and/or hydraulic intervention by the driver, which brake system makes sufficient braking performance possible even in the case of a fault, by virtue of three pressure generators and a suitable redundancy concept. Of the three pressure generators, two are implemented in a redundant sub-brake system in a parallel connection on a first axle, preferably on a front axle. The third pressure generator is implemented in a further sub-brake system on a second axle, preferably on a rear axle. There is no hydraulic connection between the sub-brake systems on the various axles.

The invention claimed is:

1. A hydraulic brake system for a vehicle having at least two axles comprising:
    a first sub-brake system assigned to a first axle that has at least two first wheel brakes, the first sub-brake system comprising:
        a first brake circuit having first and second pressure generators connected hydraulically in parallel between a first fluid container and the at least two first wheel brakes, and a first modulation unit configured to hydraulically connect the first and second pressure generators to the at least two first wheel brakes and to individually modulate pressure in the at least two first wheel brakes;
        a main system to which the first pressure generator is assigned, the main system including a first power supply and a first evaluation and control unit; and
        a secondary system to which the second pressure generator is assigned, the secondary system including a second power supply, which is independent of the first power supply, and a second evaluation and control unit, the main and secondary systems configured to redundantly generate pressure in the first brake circuit; and
    a second sub-brake system, which is hydraulically separate from the first sub-brake system and is assigned to a second axle that has at least two second wheel brakes, the second sub-brake system comprising:
        a second brake circuit including a third pressure generator arranged between a second fluid container and the at least two second wheel brakes, and a second modulation unit configured to hydraulically connect the third pressure generator to the at least two second wheel brakes and to individually modulate brake pressure in the at least two second wheel brakes; and
        a subsidiary system to which the third pressure generator is assigned and that is configured to generate pressure in the second brake circuit, the subsidiary system including a third power supply and a third evaluation and control unit.

2. The brake system as claimed in claim 1, wherein at least one of the first modulation unit and the second modulation unit comprises an inlet valve and an outlet valve for each associated one of the respective first and second wheel brakes so as to individually modulate brake pressure.

3. The brake system as claimed in claim 2, wherein:
    at least one of the first sub-brake system and the second sub-brake system is configured as a hydraulically open system;
    a first pressure discharge path in the first sub-brake system connects the outlet valves of the at least two first wheel brakes to the first fluid container; and
    a second pressure discharge path in the second sub-brake system connects the outlet valves of the at least two second wheel brakes to the second fluid container.

4. The brake system as claimed in claim 1, wherein each of the first, second, and third pressure generators includes a plunger system, a pump system, a pump system with a pressure accumulator, or electrohydraulic actuators.

5. The brake system as claimed in claim 1, wherein the first pressure generator includes a first plunger system, the second pressure generator includes a second plunger system or a pump system, and the third pressure generator includes a third plunger system.

6. The brake system as claimed in claim 5, wherein:
    the second pressure generator includes the pump system; and
    the first brake circuit includes a pressure maintenance and control valve for the pump system, assigned to the secondary system, the pressure maintenance and control valve being actuated by the second evaluation and control unit and supplied with power by the second power supply.

7. The brake system as claimed in claim 5, wherein:
    a first shutoff valve is configured to connect the first pressure generator to the at least two first wheel brakes; and
    a second shutoff valve is configured to connect the second pressure generator to the at least two first wheel brakes.

8. The brake system as claimed in claim 7, wherein the first and second shutoff valves are assigned to the main system, are supplied with power by the first power supply, and are actuated by the first evaluation and control unit in such a way that when one of the first and second pressure generators is activated, hydraulic fluid is not fed through the other of the first and second pressure generators.

9. The brake system as claimed in claim 7, wherein the first and second shutoff valves are assigned to the secondary system, are supplied with power by the second power supply, and are actuated by the second evaluation and control unit in such a way that when one of the first and second pressure generators is activated, hydraulic fluid is not fed through the other of the first and second pressure generators.

10. The brake system as claimed in claim 5, wherein the second brake circuit has, for the third plunger system, a shutoff valve configured to enable recharging brake fluid from the second fluid container.

11. The brake system as claimed in claim 5, wherein:
the first brake circuit has, for the first plunger system, a first suction line with a first nonreturn valve which additionally connects the first plunger system hydraulically to the first fluid container; and
the second brake circuit has, for the third plunger system, a second suction line with a second nonreturn valve which additionally connects the third plunger system hydraulically to the second fluid container.

12. The brake system as claimed in claim 5, wherein the second pressure generator includes the pump system.

13. The brake system as claimed in claim 12, wherein:
a first solenoid valve is configured to hydraulically connect the first pressure generator to the at least two first wheel brakes, the first solenoid valve enabling recharging of brake fluid from the first fluid container; and
the second pressure generator is connected directly to the at least two first wheel brakes.

14. The brake system as claimed in claim 13, wherein the first solenoid valve is a first shutoff valve assigned to the secondary system and which is actuated by the second evaluation and control unit and supplied with power by the second power supply.

15. The brake system as claimed in claim 13, wherein:
the first brake circuit includes a pressure maintenance and control valve for the pump system assigned to the secondary system, the pressure maintenance and control valve being actuated by the second evaluation and control unit and supplied with power by the second power supply; and
the first solenoid valve is the pressure maintenance and control valve of the second pressure generator.

16. The brake system as claimed in claim 1, wherein:
the first, second, and third evaluation and control units communicate with one another via a bus system; and
the first and second evaluation and control units of the first sub-brake system are configured as a master, and the third evaluation and control unit of the second sub-brake system is configured as a slave.

17. The brake system as claimed in claim 1, wherein components of the first modulation unit are assigned to the main system such that the components of the first modulation unit and the first pressure generator are actuated by the first evaluation and control unit and are supplied with power by the first power supply.

18. The brake system as claimed in claim 1, wherein components of the second modulation unit are assigned to the subsidiary system such that the components of the second modulation unit and the third pressure generator are actuated by the third evaluation and control unit and are supplied with power by the third power supply.

19. The brake system as claimed in claim 1, wherein one of the first power supply of the main system and the second power supply of the secondary system is used as the third power supply of the subsidiary system.

20. The brake system as claimed in claim 1, wherein the first axle is a front axle, and the second axle is a rear axle, of the vehicle.

* * * * *